(12) United States Patent
Guzik et al.

(10) Patent No.: US 11,977,843 B2
(45) Date of Patent: May 7, 2024

(54) DYNAMIC ONTOLOGY FOR INTELLIGENT DATA DISCOVERY

(71) Applicant: S&P Global Inc., New York, NY (US)

(72) Inventors: Stanley Guzik, Ridgewood, NJ (US);
Prashant Desai, Princeton, NJ (US);
Anthony Sweet, Aurora, CO (US);
Jason Holden, Charlottesville, VA (US)

(73) Assignee: S&P Global Inc., New York, NY (US)

( * ) Notice: Subject to any disclaimer, the term of this patent is extended or adjusted under 35 U.S.C. 154(b) by 356 days.

(21) Appl. No.: 17/648,748

(22) Filed: Jan. 24, 2022

(65) Prior Publication Data

US 2023/0237269 A1 Jul. 27, 2023

(51) Int. Cl.
| | |
|---|---|
| *G06F 16/29* | (2019.01) |
| *G06F 16/36* | (2019.01) |
| *G06F 40/247* | (2020.01) |
| *G06F 40/295* | (2020.01) |

(52) U.S. Cl.
CPC .......... *G06F 40/295* (2020.01); *G06F 16/367* (2019.01); *G06F 40/247* (2020.01)

(58) Field of Classification Search
CPC ..... G06F 16/367; G06F 40/295; G06F 40/247
See application file for complete search history.

(56) References Cited

U.S. PATENT DOCUMENTS

| 10,169,454 B2* | 1/2019 | Ait-Mokhtar | ......... G06F 16/367 |
| 2016/0162476 A1* | 6/2016 | Munro | .................. G06F 40/137 |
| | | | 704/9 |

* cited by examiner

*Primary Examiner* — Loc Tran
(74) *Attorney, Agent, or Firm* — Yee & Associates, P.C.

(57) ABSTRACT

A method, apparatus, system, and computer program code for intelligent data discovery with dynamic ontology are provided. According to one illustrative embodiment, the method using a number of processors to perform the steps of: identifying a set of data items in unstructured content using a dynamic data schema populated from a dynamic ontology; and responsive to identifying a data item that is not recognized in the data schema: storing the data item with labels; generating a weight for the data item; and responsive to the weight exceeding a threshold, updating the schema to include the data item that was not recognized.

15 Claims, 6 Drawing Sheets

DYNAMIC ONTOLOGY FOR INTELLIGENT DATA DISCOVERY

BACKGROUND

1. Field

The disclosure relates generally to an improved computer system and, more specifically, to a method, apparatus, computer system, and computer program product for intelligent data discovery using a dynamic ontology.

2. Description of the Related Art

Natural language processing is an ability of a computer to understand human language and is an important component of artificial intelligence. Natural language processing may, for example, parse text into identifiable parts, such as words, phrases, numbers, and punctuation marks. Natural language processing may perform various methods and techniques for analyzing text, such as, for example, morphological analysis, syntactic analysis, semantic analysis, lexical analysis, and the like.

Automated text classification is an important aspect in Natural Language Processing. Machine-learning based text classification often utilizes automated feature selection techniques based on statistics derived from the distribution of features within a corpus, or their joint distribution with document classes. Ontologies have been utilized to improve feature ranking and selection. Text is mapped to concepts from an ontology that encodes semantic relationships between concepts.

However, current ontological systems are static and cannot evolve through time. These ontological classifications are "black and white"—classifying text as either belong to, or not belong to, the defined concepts and relationships within an ontology. Any change to the ontology relies on a large number of data analysts, who must manually go through thousands of documents to entities and their relationships. These methods suffer from both scalability and subjectivity: it is difficult to quickly identify new entities and their relationships within an ontology over thousands of documents. Furthermore, as different documents are reviewed by different analysts, ontological classification standards and quality may vary.

Therefore, it would be desirable to have a method and apparatus that would take into account at least some of the issues discussed above, as well as other possible issues.

SUMMARY

According to one embodiment of the present invention, a method provides for intelligent data discovery with dynamic ontology. The method comprises using a number of processors to perform the steps of: identifying a set of data items in unstructured content using a dynamic data schema populated from a dynamic ontology; and responsive to identifying a data item that is not recognized in the data schema: storing the data item with labels; generating a weight for the data item; and updating the schema to include the data item that was not recognized in response to the weight exceeding a threshold.

According to another embodiment of the present invention, a computer system for intelligent data discovery with dynamic ontology comprises a storage device configured to store program instructions and one or more processors operably connected to the storage device. The one or more processors are configured to execute the program instructions to cause the system to: identify a set of data items in unstructured content using a dynamic data schema populated from a dynamic ontology; responsive to identifying a data item that is not recognized in the data schema: store the data item with labels; generate a weight for the data item; and responsive to the weight exceeding a threshold, update the schema to include the data item that was not recognized.

According to yet another embodiment of the present invention, a computer program product for intelligent data discovery with dynamic ontology comprises a computer-readable storage medium having program instructions embodied thereon to perform the steps of: identifying a set of data items in unstructured content using a dynamic data schema populated from a dynamic ontology; responsive to identifying a data item that is not recognized in the data schema: storing the data item with labels; generating a weight for the data item; and responsive to the weight exceeding a threshold, updating the schema to include the data item that was not recognized.

DETAILED DESCRIPTION

The illustrative embodiments recognize and take into account one or more different considerations. The illustrative embodiments recognize and take into account that unstructured documents may organize information in a way that is understandable to humans but not to machines. For example, texts can be arranged on a page in a tabular form, so that row or column headers might be associated with values in the body of the table, but it is non-trivial for a computer to identify this tabular structure and associate its contents correctly. This complicates the automated extraction of information from such documents.

The illustrative embodiments also recognize and take into account that current methods include parsing components of unstructured documents into machine-readable formats, e.g., identifying and parsing tables, forms, images and free-text. Commercial products exist that accept a raw document (including images or scans of documents), identify, and segment structures from the document, and return their contents in a machine-readable form (e.g., Excel, CSV, or JSON files). These solutions are faithful to the structures as they are represented on the page. However, remaining faithful to the structures as represented on page is inadequate if a user intends to database information that is represented in documents that vary in format or presentation.

The illustrative embodiments provide a method to intelligently perform automated data discovery and extraction tasks from both structured and unstructured documents using dynamic ontology. The extraction service might be accessed via an application programming interface (API) that allows a user to pass in a minimal set of information. Specifically, the user might establish (1) what entities he or she is looking for in the document; (2) aliases for these entities, or other means of identifying mentions of these entities in text; and (3) what combinations of entities should be extracted together.

For example, the user might indicate that a document could contain two types of data items: a numeric item, such as dollars of revenue, which is accompanied with units, and a text item, such as a positive or negative recommendation, which is not accompanied by units. For each entity (including units), the user supplies aliases that assist the system in identifying the entity. This process enables the development of an end-to-end automated structured data extraction system. Schemas are passed to the system via an API. The schemas can be associated with sets of documents, and a unique implementation is then used to perform data extraction.

Figure 1:
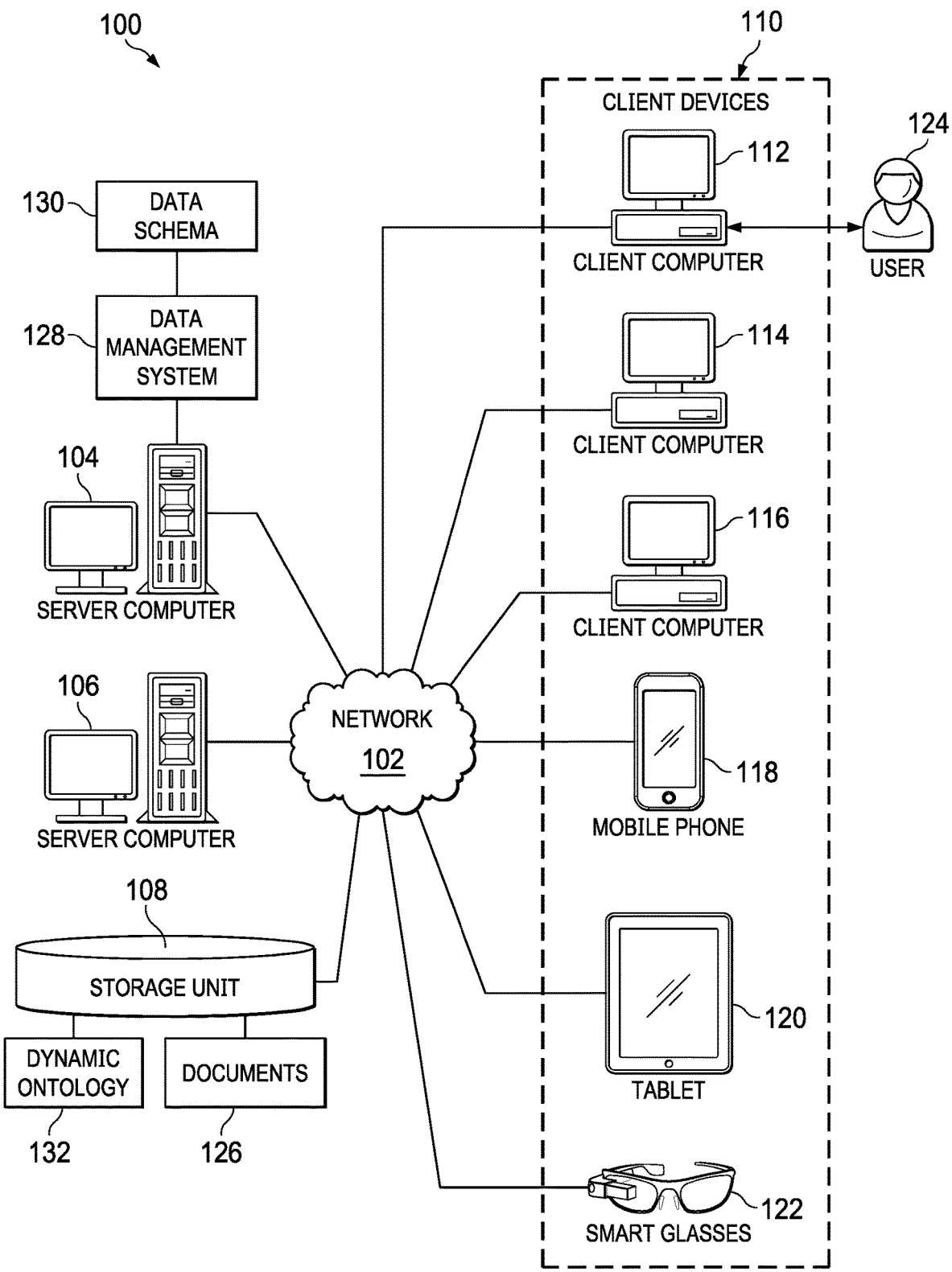
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 at client computer 112 can send documents 126 to data management system 128 for analysis. In this illustrative example, data management system 128 might extract data items from documents 126 according to a data schema 130 populated from a dynamic ontology 132.

In this illustrative example, data management system 128 can receive unstructured data from a number of different sources. Using a dynamic data schema populated from a dynamic ontology, data management system 128 identifies data items their inter-relationships within the unstructured data. Data items that are not recognized within the schema can stored and used to dynamically update the schema and ontology according to calculated relationship weights between the unrecognized data item and known data items within the ontology.

Figure 2:
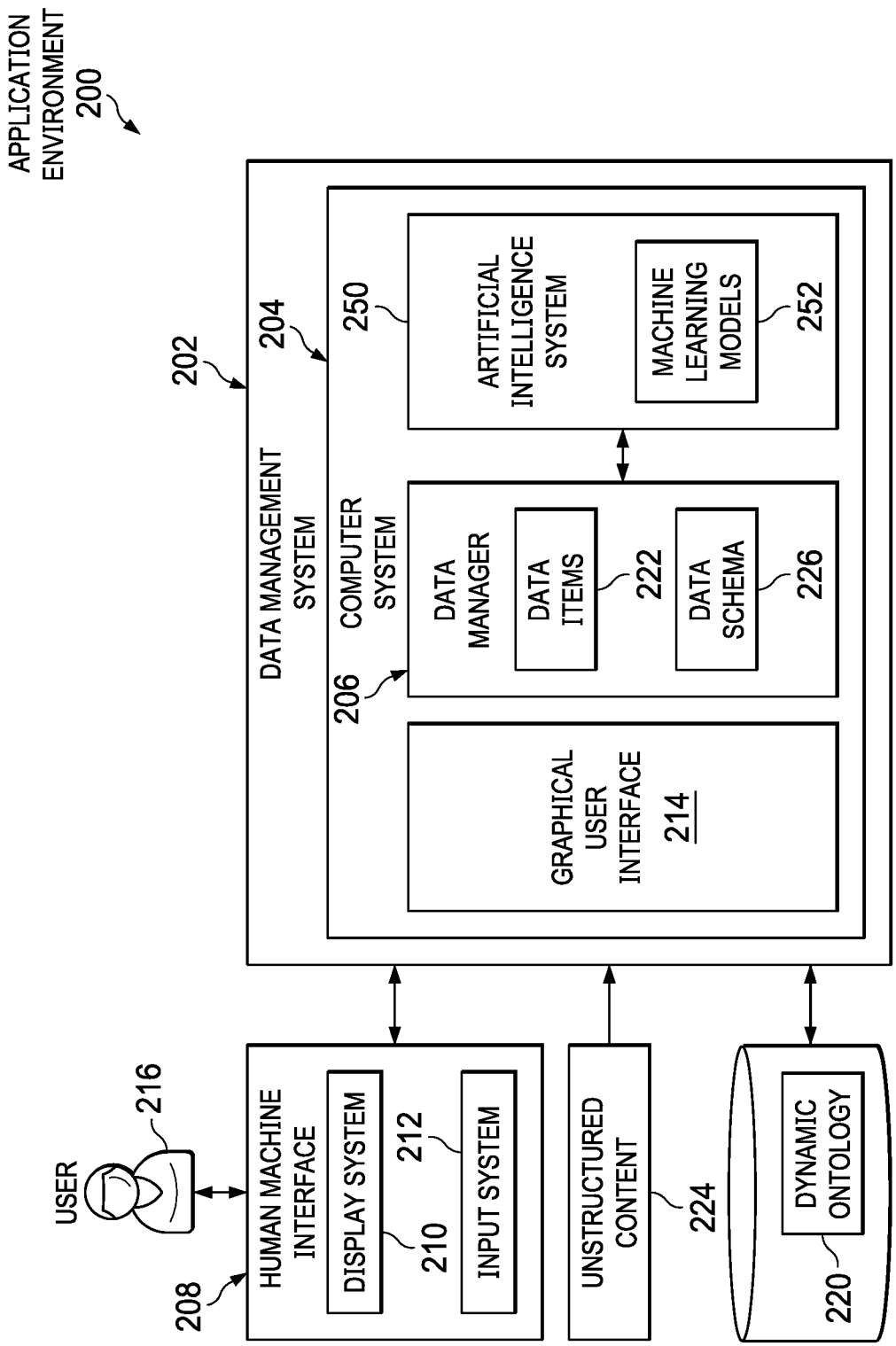
FIG. 2 is a block diagram of an application environment depicted in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1.

In this illustrative example, data management system 202 in application environment 200 can perform methods for intelligent data discovery with dynamic ontology. As documents are ingested, data management system 202 identifies data items within the documents, and extracts data items that are recognized according to a dynamic schema, populated from the ontology. Data management system 202 updates the schema and ontology according to calculated weights for data items that are not recognized.

As depicted, data management system 202 comprises computer system 204 and data manager 206. Data manager 206 runs in computer system 204. Data manager 206 can be implemented in software, hardware, firmware, or a combination thereof. When software is used, the operations performed by data manager 206 can be implemented in program code configured to run on hardware, such as a processor unit. When firmware is used, the operations performed by data manager 206 can be implemented in program code and data and stored in persistent memory to run on a processor unit. When hardware is employed, the hardware may include circuits that operate to perform the operations in data manager 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

In this illustrative example, human machine interface 208 can enable user 216 to interact with one or more computers or other types of computing devices in computer system 204. For example, these computing devices can be client devices such as client devices 110 in FIG. 1. As depicted, human machine interface 208 comprises display system 210 and input system 212.

Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Input system 212 is a physical hardware system and can be selected from at least one of a mouse, a keyboard, a trackball, a touchscreen, a stylus, a motion sensing input device, a gesture detection device, a cyber glove, or some other suitable type of input device. User 216 is a person that can interact with graphical user interface 214 through user input generated by input system 212 for computer system 204.

In this illustrative example, data manager 206 in computer system 204 is configured to perform intelligent data discovery using dynamic ontology 220. Dynamic ontology 220 defines the terms used to describe and represent an area of knowledge. Ontological terms are concepts and properties which capture the knowledge of a domain area. Concepts are organized in a hierarchy that expresses the relationships among them by means of superclasses representing higher level concepts, and subclasses representing specific (constrained) concepts. Properties are of two types: those that describe attributes (features) of the concepts, and those that introduce binary relations between the concepts.

In the illustrative examples, the concepts and properties in dynamic ontology 220 are dynamic. In other words, dynamic ontology 220 automatically evolves to introduce further concepts and properties that are identified as additional documents are processed.

In this illustrative example, data manager 206 identifies a set of data items 222 in unstructured content 224 using a dynamic data schema 226 populated from a dynamic ontology 220.

Unstructured content 224 can be one or more documents received from one or more different sources. As used here in, "unstructured content" is information, i.e., a document, that is not arranged according to a pre-set data model or schema, and therefore cannot be stored in a traditional relational database or RDBMS. For example, unstructured content can include text, multimedia, email, videos, photos, webpages, and audio files.

Data schema 226 provides a structure for what kind of data are sought in the Unstructured content 224 (e.g., numeric values, financial periods, financial metrics, accounting standards, units, currencies, and scales, etc.), how to find that information (aliases), and where the information is expected to be located (free floating text, table content, table headers, etc.).

For example, the dynamic ontology 220 might establish (1) what entities should be looked for in the data; (2) aliases for these entities, or other means of identifying mentions of these entities in text; and (3) what combinations of entities should be extracted together. The dynamic ontology 220 and the data schema 226 might be associated via an application programming interface (API) that allows population of the data schema 226 directly from the dynamic ontology 220 based on queried concepts or relationships.

In some illustrative examples, data manager 206 can use artificial intelligence system 250. Artificial intelligence system 250 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 250 can include a set of machine learning models 252. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

Data manager 206 may identify data items 222 by employing natural language processing (NLP) techniques such as, e.g., named entity recognition, part-of-speech tagging, and word embedding. Data manager 206 may also identifying a set of relationships between the data item and other identified data items through a relation detection.

The natural language processing and relation detection may employ machine learning algorithms such comprising at least one of an Expectation-Maximization algorithm, a Spy algorithm, a partially supervised classifier, a weakly supervised classifier, a semi-supervised classifier, a positive-unlabeled classifier, a bag-of-words model, a term frequency model-inverse document frequency (tf-idf) vectorization, a Naive Bayes classifier, a Complement Naive Bayes classifier, a Logistic Regression classifier, an artificial neural network classifier, a random forest classifier, a support vector machine classifier, a distributed word embedding, or some other suitable machine learning algorithm.

It may be the case that much of the text in a document is not matched to any entity in data schema 226. In response to identifying a data item that is not recognized in the data schema 226, data manager 206 stores the data item, together with any labels generated that may describing the context of the document and relationships among the data items 222 identified therein.

Data manager 206 generates a weight for the data item, based on a proximity, such as a pairwise cosine similarity, to other data items in the dynamic ontology 220. As additional documents are processed, data manager 206 can dynamically adjust the weight of the data item, adding the data item to the dynamic schema when the weight exceeding a threshold.

One or more machine learning models 252 can be retrained based on the updated dynamic ontology 220, generating updated models to classify documents according to the updated ontology. Data manager 206 can then classify the unstructured content 224 according to the dynamic ontology 220 and the set of data items 222 identified in the unstructured content 224.

Computer system 204 can be configured to perform at least one of the steps, operations, or actions described in the different illustrative examples using software, hardware, firmware, or a combination thereof. As a result, computer system 204 operates as a special purpose computer system in data manager 206 in computer system 204. In particular, data manager 206 transforms computer system 204 into a special purpose computer system as compared to currently available general computer systems that do not have data manager 206. In this example, computer system 204 operates as a tool that can increase at least one of speed, accuracy, or usability of computer system 204. In particular, this increase in performance of computer system 204 can be for the intelligent discovery and classification of unstructured data.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
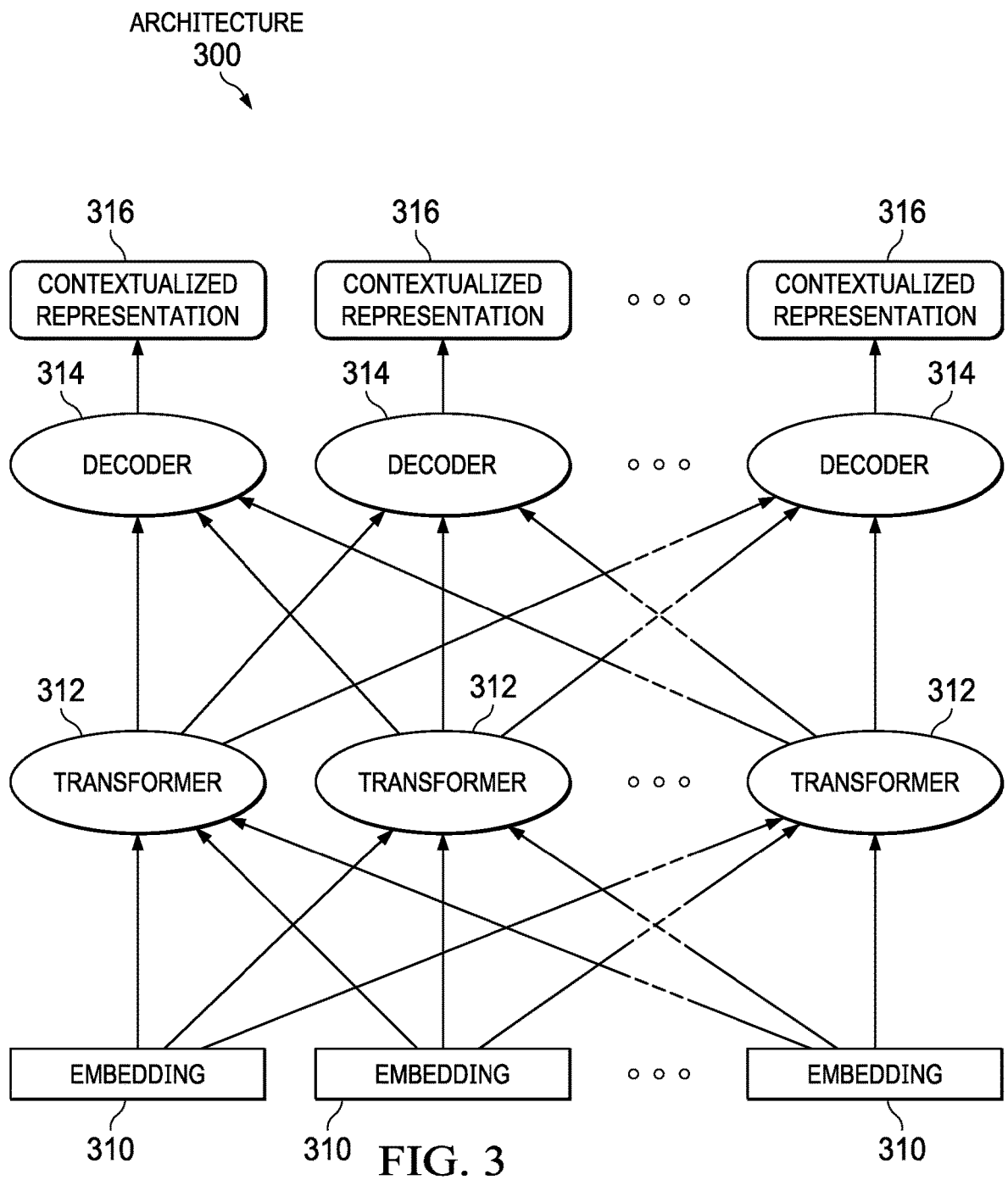
FIG. 3 is an architecture of an artificial intelligence model to classify an entity depicted in accordance with an illustrative embodiment.

With reference next to FIG. 3, an architecture of an artificial intelligence model to classify an entity is depicted in accordance with an illustrative embodiment. Architecture 300 is an example of an architecture used to make one or more artificial intelligence models. In the illustrative examples, the same reference numeral may be used in more than one figure. This reuse of a reference numeral in different figures represents the same element in the different figures.

As used herein, a "sentence" can be an arbitrary span of contiguous text, rather than an actual linguistic sentence. A "sequence" refers to the input token sequence to BERT, which may be a single sentence or multiple sentences packed together.

Embeddings 310 are vector representation of words in the natural language descriptions found in documents. In architecture 300, each of embeddings 310 is a combination of three embeddings: positional embeddings to express the position of words in a sentence, segment embedding to distinguish between sentence pairs, and token embeddings learned for the specific token from a training corpus token vocabulary.

As used herein, a "sentence" can be an arbitrary span of contiguous text, rather than an actual linguistic sentence. A "sequence" refers to the input token sequence, which may be a single sentence or multiple sentences packed together.

Embeddings 310 of the input sequence are passed to all the transformers 312 in a first layer of the stack. The embeddings are then transformed and propagated to additional transformers in a next layer (not shown) of the stack. The output from the last encoder in the encoder-stack is passed to all the decoders 314 in the decoder-stack, which output the final contextualized representation 316 of each input word.

Figure 4:
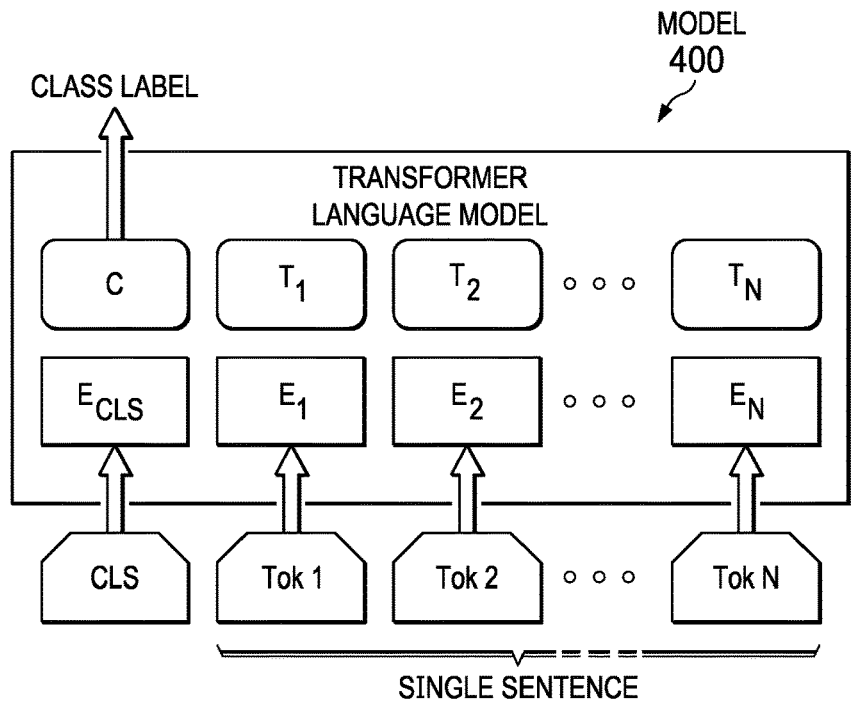
FIG. 4 is a task-specific classification model depicted in accordance with an illustrative embodiment.

Turning now to FIG. 4, a task-specific classification model is depicted in accordance with an illustrative embodiment. Model 400 is one example of architecture 300 of FIG. 3.

Model 400 is a sequence-level task for classifying a single sentence. As depicted, E represents the input embedding, such as embeddings 310 of FIG. 3. T represents the contextual representation of a token, such as contextual representation 316 of FIG. 3. CLS is the special symbol for classification output.

Figure 5:
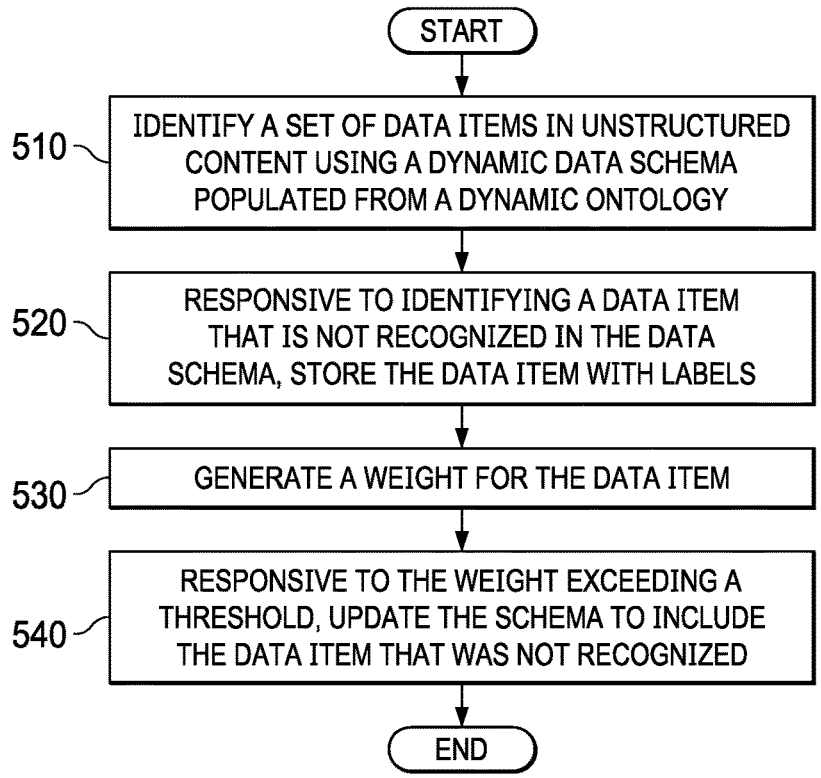
FIG. 5 is a flowchart of a process for real-time visual guidance depicted in accordance with an illustrative embodiment.

Turning next to FIG. 5, a flowchart of a process for real-time visual guidance is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in data manager 206 in computer system 204 in FIG. 2.

The process begins by identifying a set of data items in unstructured content using a dynamic data schema populated from a dynamic ontology (step 510). The schema can include known attributes of data items, known aliases of data items, and specified relationships between data items.

Responsive to identifying a data item that is not recognized in the data schema, the process stores the data item with labels (step 520) and generates a weight for the data item (step 530). The weight can be based on a proximity to data elements in the ontology.

Responsive to the weight exceeding a threshold, the process updates the schema to include the data item that was not recognized, (step 540). The process terminates thereafter.

Figure 6:
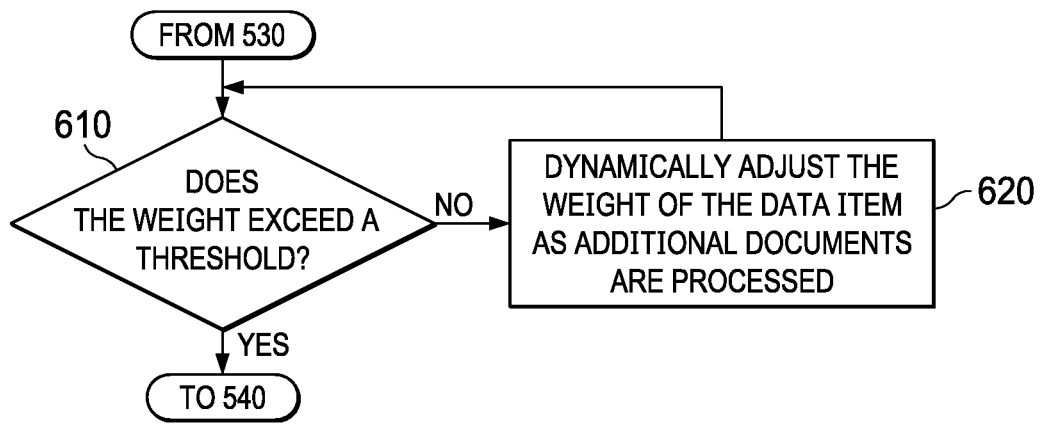
FIG. 6 is a flowchart of a process for real-time visual guidance depicted in accordance with an illustrative embodiment.

With reference next to FIG. 6, a flowchart of a process for capturing a set of actions is depicted in accordance with an illustrative embodiment.

Continuing from step 530 of FIG. 5, the process determines if the weight exceeding a threshold (step 610). Responsive to determining that the weight does not exceed a threshold ("no" at step 610), the process dynamically adjusts the weight of the data item as additional documents are processed (step 620). Thereafter, the process can you iterate back to step 610.

Returning now to step 610, Responsive to determining that the weight exceeds a threshold ("yes" at step 610), the process updates the schema to include the data item that was not recognized, as shown in step 540 of FIG. 5. The process may terminate thereafter.

Figure 7:
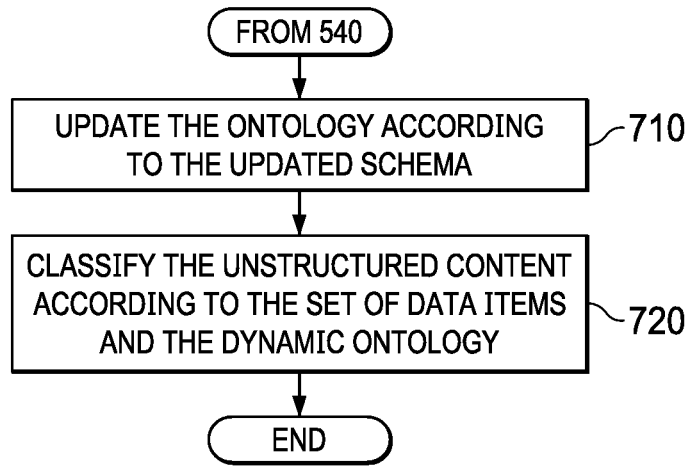
FIG. 7 is a flowchart of a process for capturing a set of actions depicted in accordance with an illustrative embodiment.

With reference next to FIG. 7, a flowchart of a process for capturing a set of actions is depicted in accordance with an illustrative embodiment. The process in FIG. 7 is second example of additional processing steps that can be implemented in conjunction with process 500 of FIG. 5.

Continuing from step 540, the process updates the ontology according to the updated schema (step 710). An artificial intelligence system may use the updated schema to train, or retrain, one or more machine learning models. Using these machine learning models, the process classifies the unstructured content according to the set of data items and the dynamic ontology (step 720). Thereafter, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
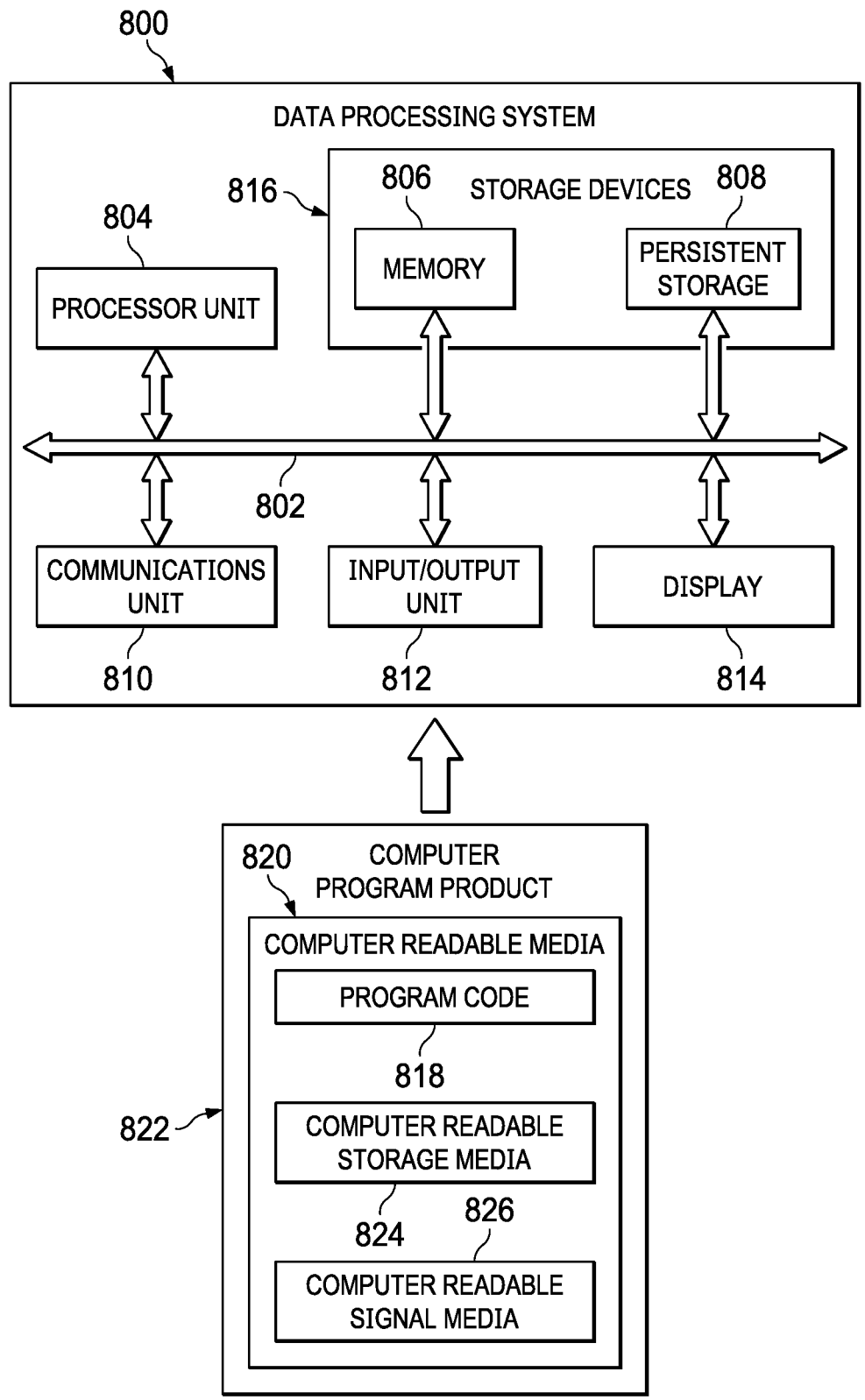
FIG. 8 is a block diagram of a data processing system depicted in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. Data processing system 800 can also be used to implement computer system 204 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are program instructions and are also referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818. Computer-readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 818 can be transferred to data processing system 800 using a computer-readable signal media. The computer-readable signal media are signals and can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in one data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for intelligent data discovery with dynamic ontology, the method comprising:
   using a number of processors to perform the steps of:
   identifying a set of data items in unstructured content using a dynamic data schema populated from a dynamic ontology;
   responsive to identifying a data item that is not recognized in the dynamic data schema:
   storing the data item with labels;
   generating a weight for the data item, wherein the weight is based on a proximity to other data elements in the dynamic ontology, and the weight is dynamically adjusting as additional documents are processed; and
   responsive to the weight exceeding a threshold, updating the dynamic data schema to include the data item that was not recognized.

2. The method of claim 1, wherein the schema comprises:
   known attributes of data items;
   known aliases of data items; and
   specified relationships between data items.

3. The method of claim 1, further comprising:
   identifying the data item using a named entity recognition; and
   identifying a set of relationships that relate the data item to the set of data items through a relation detection.

4. The method of claim 1, further comprising: responsive to updating the dynamic data schema, updating the dynamic ontology according to the dynamic data schema.

5. The method of claim 1, further comprising:
   classifying the unstructured content according to the set of data items and the dynamic ontology.

6. A computer system for intelligent data discovery with dynamic ontology, the computer system comprising:
- one or more processors;
- a set of one or more non-transitory computer-readable storage media; and
- program instructions, collectively stored in the set of one more non-transitory computer-readable storage media, for causing the one or more processors to perform the following computer operations:
- identify a set of data items in unstructured content using a dynamic data schema populated from a dynamic ontology;
- responsive to identifying a data item that is not recognized in the dynamic data schema:
  - store the data item with labels;
  - generate a weight for the data item, wherein the weight is based on a proximity to other data elements in the dynamic ontology, and the weight is dynamically adjusting as additional documents are processed; and
  - responsive to the weight exceeding a threshold, update the dynamic data schema to include the data item that was not recognized.

7. The computer system of claim 6, wherein the schema comprises:
- known attributes of data items;
- known aliases of data items; and
- specified relationships between data items.

8. The computer system of claim 6, wherein the one or more processors are further configured to execute the program instructions to cause the system to:
- identify the data item using a named entity recognition; and
- identify a set of relationships that relate the data item to the set of data items through a relation detection.

9. The computer system of claim 6, wherein the one or more processors are further configured to execute the program instructions to cause the system to: responsive to updating the dynamic data schema, update the dynamic ontology according to the dynamic data schema.

10. The computer system of claim 6, wherein the one or more processors are further configured to execute the program instructions to cause the system to:
classify the unstructured content according to the set of data items and the dynamic ontology.

11. A computer program product for intelligent data discovery with dynamic ontology, the computer program product comprising:
- a non-transitory computer-readable storage medium having program instructions embodied thereon to perform the steps of:
- identifying a set of data items in unstructured content using a dynamic data schema populated from a dynamic ontology;
- responsive to identifying a data item that is not recognized in the dynamic data schema:
- storing the data item with labels;
- generating a weight for the data item, wherein the weight is based on a proximity to other data elements in the dynamic ontology, and the weight is dynamically adjusting as additional documents are processed; and
- responsive to the weight exceeding a threshold, updating the dynamic data schema to include the data item that was not recognized.

12. The computer program product of claim 11, wherein the schema comprises:
- known attributes of data items;
- known aliases of data items; and
- specified relationships between data items.

13. The computer program product of claim 11, further comprising:
- identifying the data item using a named entity recognition; and
- identifying a set of relationships that relate the data item to the set of data items through a relation detection.

14. The computer program product of claim 11, further comprising:
- responsive to updating the dynamic data schema, updating the dynamic ontology according to the dynamic data schema.

15. The computer program product of claim 11, further comprising:
- classifying the unstructured content according to the set of data items and the dynamic ontology.

\* \* \* \* \*